US007669499B2

(12) United States Patent
Mittermeyer

(10) Patent No.: US 7,669,499 B2
(45) Date of Patent: Mar. 2, 2010

(54) ARRESTER DEVICE FOR A CLOSING APPARATUS

(75) Inventor: Wolfgang Mittermeyer, Miesbach (DE)

(73) Assignee: Sigl Elektromotoren GmbH & Co. KG, Miesbach (DE)

( * ) Notice: Subject to any disclaimer, the term of this patent is extended or adjusted under 35 U.S.C. 154(b) by 527 days.

(21) Appl. No.: 11/601,580

(22) Filed: Nov. 17, 2006

(65) Prior Publication Data

US 2007/0143964 A1 Jun. 28, 2007

(30) Foreign Application Priority Data

Nov. 22, 2005 (DE) .................. 20 2005 018 238 U

(51) Int. Cl.
*F16H 1/16* (2006.01)
*F16H 1/20* (2006.01)
*F16H 55/12* (2006.01)
*B25G 3/00* (2006.01)
*F16B 2/02* (2006.01)
*F16B 7/04* (2006.01)

(52) U.S. Cl. .......................... 74/425; 74/451; 403/350; 403/352

(58) Field of Classification Search .................. 74/409, 74/425, 451; 192/223; 403/3, 4, 350, 352
See application file for complete search history.

(56) References Cited

U.S. PATENT DOCUMENTS 2,335,606 A * 11/1943 Pelphrey ...................... 74/396
3,813,958 A * 6/1974 Meyer ......................... 74/425
4,515,380 A * 5/1985 Schumacher ........... 280/93.506
4,586,393 A * 5/1986 Mooney et al. ............... 74/396
4,686,863 A * 8/1987 Inoue et al. ................... 74/425
5,104,141 A * 4/1992 Grove et al. ........... 280/86.753
6,357,313 B1 * 3/2002 Appleyard ............. 74/388 PS

FOREIGN PATENT DOCUMENTS

DE 2222503 4/1974
DE 3129648 A1 * 2/1983
DE 3433561 3/1986

* cited by examiner

*Primary Examiner*—Thomas R Hannon
*Assistant Examiner*—Justin Krause
(74) *Attorney, Agent, or Firm*—Alleman Hall McCoy Russell & Tuttle LLP

(57) ABSTRACT

The present disclosure relates to an arrester device for closing apparatus, such as doors, comprising a worm gear rotationally fixedly connected to an output shaft serving as a winding shaft and a self-locking worm which is in communication with an input shaft. In accordance with the present disclosure, an auxiliary worm gear is seated on an eccentric region of the output shaft with clearance, with the auxiliary worm gear having an eccentricity of the same amount as the output shaft and being assembled such that the eccentricities are cancelled with respect to the axis of the output shaft, with the auxiliary worm gear being able to follow the movement of the worm gear without load via its toothed region.

12 Claims, 2 Drawing Sheets

ARRESTER DEVICE FOR A CLOSING APPARATUS

CROSS-REFERENCE TO RELATED APPLICATION

This application claims priority to German Utility Model Application Serial No. DE 20 2005 018 238.9, filed Nov. 22, 2005, which is hereby incorporated by reference in its entirety for all purposes.

FIELD

The present disclosure relates to an arrester device for closing apparatus such as doors.

BACKGROUND AND SUMMARY

Arrester devices of this type serve as a security against falling for closing apparatus which are equipped with a worm gear rotationally fixedly connected to an output shaft serving as a winding shaft and with a self-locking worm which is in communication with an input shaft.

Arrester devices of this type are used in doors whose leaf weight is not compensated by springs to ensure the safe operation of said doors. A falling of the door leaf is prevented here in the event of a break of the support element at the drive. Arrester devices of this type can be attached directly to the door shaft or be integrated in the drive.

Integrated arrester devices have already become known which intercept the load via a second worm wheel, which runs along without load, in the event of a break of the support element. Arresting mechanisms are further known in which an auxiliary worm gear runs along (almost) free of load and rotates relative to the working worm gear in the event of a break of the support element. Spring-loaded bolts can thereby be released, on the one hand, to latch into corresponding pockets which are suitable to intercept the load in a shape-matched manner. In accordance with another alternative, rotatably supported clamping pieces can be rotated such that they contact the housing wall radially and bring the load to a stop by friction.

An automatically operating locking device is known from DE 22 22 503 C, for example, to prevent an unwanted rolling down of a roller door, roller grills, roller shutters or the like of the initially recited type in which the arrester device consists of two worm gears arranged on the winding shaft each being driven by a separate worm. In this connection, a worm drive is constantly under load as a working drive, while the other worm drive runs along without load as an auxiliary worm drive. The self-locking auxiliary worm, which is supported in a limited axially displaceable manner, is in communication with its auxiliary worm gear free of any self-load. On a failure of the working worm drive, load is transferred to the auxiliary worm drive, with simultaneously the forwarding of the drive torque to the auxiliary worm being interrupted at a designated desired breaking point. The load then becomes stationary due to the self-locking of the auxiliary worm drive, with the auxiliary worm coming into contact with an abutment bolt fixed to the housing. In this known arrester device, the drive worm and the auxiliary worm are fastened to parallel shafts separate from one another whose kinematic connection consists of a spur gear. This known arrester device is very complex in construction due to the second worm shaft of its drive and the necessary bearings.

In accordance with DE 34 33 561 C, this complex structure is simplified in that only one worm gear is provided which meshes with the self-locking worm, on the one hand, and with the auxiliary worm, on the other hand. Both worms are made as globoid half-worms here. The self-locking worm and the auxiliary worm are arranged successively on a common working shaft. The self-locking worm forms a rotationally fixed unit with the drive shaft, whereas the auxiliary worm constantly runs along free of load via a driver and is supported axially displaceably between abutments fixed to the housing for the compensation of the wear at the self-locking worm. In the event of a breakage of the self-locking worm, the self-locking auxiliary worm, which serves as an arresting worm here, supports the load against its abutments.

All the aforesaid variants with an integrated arrester device have a high number of single parts which result in a high assembly effort and thus comparatively high assembly costs.

It is the object of the present disclosure to provide an arrester device of the type first named which permits an operating security which is as good as possible with a construction which is as simple as possible.

In accordance with the present disclosure, the object is solved by an arrester device in accordance with various combinations of the features disclosed herein. Accordingly, the arrester device serving for a closing apparatus, for example a door, has a worm gear rotationally fixedly connected to an output shaft serving as a winding shaft and a self-locking worm which is in communication with an input shaft. An auxiliary worm gear is additionally placed on an eccentric region of the output shaft with clearance, with the auxiliary worm gear likewise having an eccentricity of the same amount and being mounted such that the eccentricities cancel out with respect to the axis of the output shaft, with the auxiliary worm gear being able to follow the movement of the worm gear without load via a toothed region. The auxiliary worm gear serving as security is thereby not subject to any wear during the usual operation. If there is now a break of the support element with the worm gear rotationally fixedly connected to the output shaft due to wear or overload, the auxiliary worm gear rotates with respect to the eccentric portion of the output shaft. The outer diameter of the auxiliary worm gear thereby disengages from a concentric position. In this connection, the eccentricity of the output shaft and of the auxiliary worm gear is designed such that a self-locking occurs.

In accordance with one embodiment of the present disclosure, the auxiliary worm gear moves out of its concentric position toward a cylindrical region of the transmission housing on movement. The eccentricity is designed here such that the self-locking occurs between the auxiliary worm gear and the transmission housing.

Since the total arrester device includes only one part, namely the auxiliary worm gear placed on, it is very simple and cost-effective to assemble. The arrester device works independently of the speed, direction of rotation and installed position of the transmission and responds in a stepless manner, that is independently of the division of any locking members.

Particularly advantageously, and in accordance with a further advantageous aspect of the present disclosure, regions which can be directly deformed can be provided at the auxiliary worm gear.

BRIEF DESCRIPTION OF THE FIGURES

Further features, details and advantages of the present disclosure will be explained in more detail with reference to an embodiment shown in the following figures.

DETAILED DESCRIPTION

Figure 1:
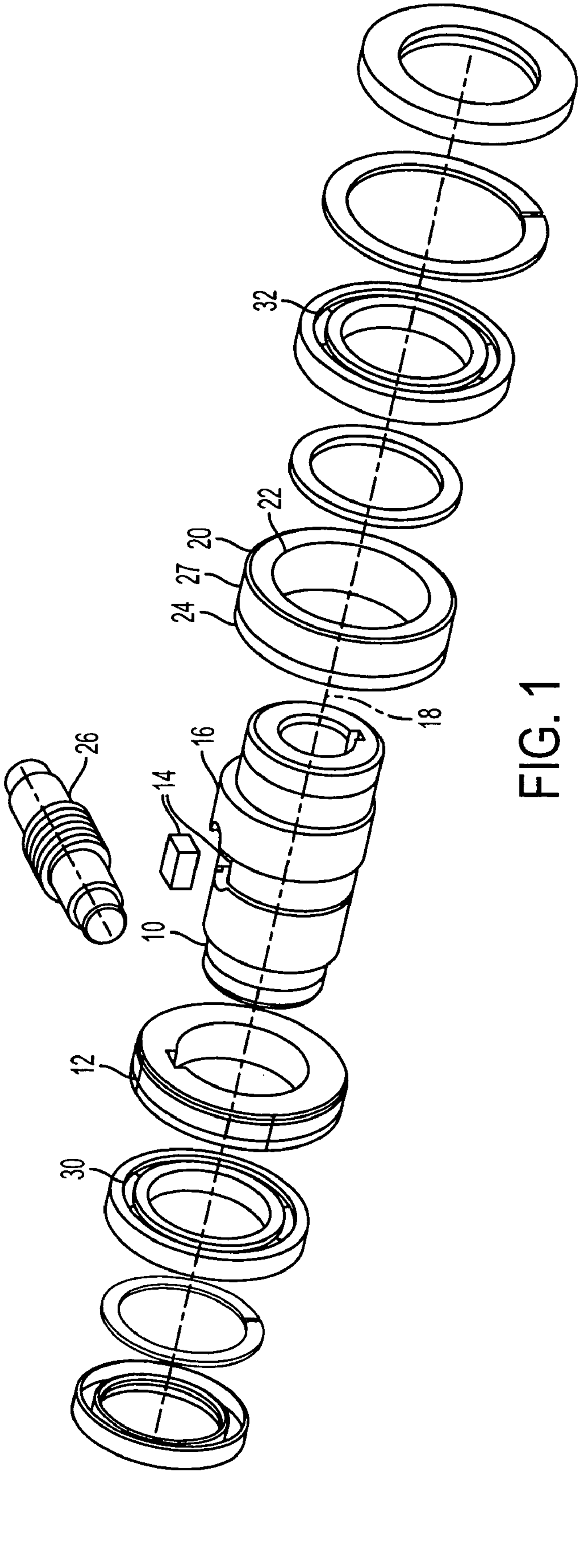
FIG. 1 shows an exploded-type representation of an arrester device in accordance with an embodiment of the present disclosure.

In accordance with the exploded representation in FIG. 1, the arrester device is arranged on an output shaft 10 which is only shown partially in FIG. 1. A worm gear 12, which can be pushed rotationally fixedly onto the output shaft via a groove and tongue connection 14, is seated on this output shaft 10. The output shaft additionally has a region 16 which is aligned eccentrically with respect to the axis 18 of the output shaft. An auxiliary worm gear 20 which has an eccentric bore 22 can be pushed onto this eccentric region 16 with a slight clearance. The eccentricities of the region 16 of the output shaft and of the bore 22 of the auxiliary worm gear 20 approximately cancel out with respect to the axis 18 of the output shaft so that the external diameters of the worm gear 12 and of the auxiliary worm gear 22 are concentric. The auxiliary worm gear 20 can follow the movement applied to the worm gear 12 by a worm 26 connected to an input shaft via its toothed region 24 without load and thus without wear.

Figure 4:
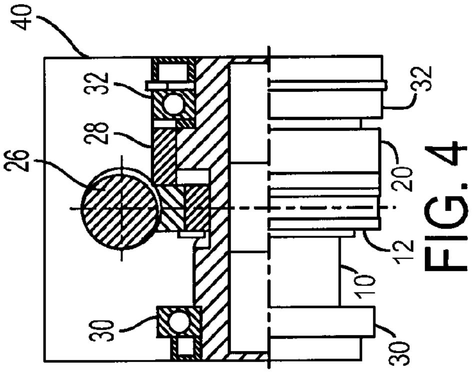
FIG. 4 shows a sectional view through a part of the arrester device.
Figure 3:
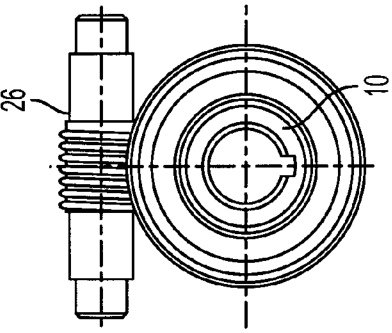
FIG. 3 shows a plan view of the arrester device in accordance with FIG. 2.

If now there is a break of the support element at the worm gear 12 due to wear or overload, the auxiliary worm gear 20 rotates with respect to the eccentric portion 16 of the output shaft 10 due to the load. This rotation is made possible by the clearance between the eccentric bore 22 and the eccentric region 16. Due to this rotational movement, the external diameter 27 of the auxiliary worm gear 20 disengages from its concentric position and presses against a cylindrical region 28 (cf. FIG. 4) of a transmission housing 40.

The eccentricity of the eccentric region 16 of the output shaft 10 and of the eccentric bore 22 of the auxiliary worm wheel 20 are designed such that a self-locking occurs between the auxiliary worm gear 20 and the transmission housing 40. The radial forces which build up are supported at the transmission housing 40 via bearings 30 and 32 attached to the output shaft 10 and thus prevent a further rotation of the output shaft 10 with respect to the auxiliary worm gear 20. The load which acts as torque on the input shaft 10 is thus braked by friction.

Figure 2:
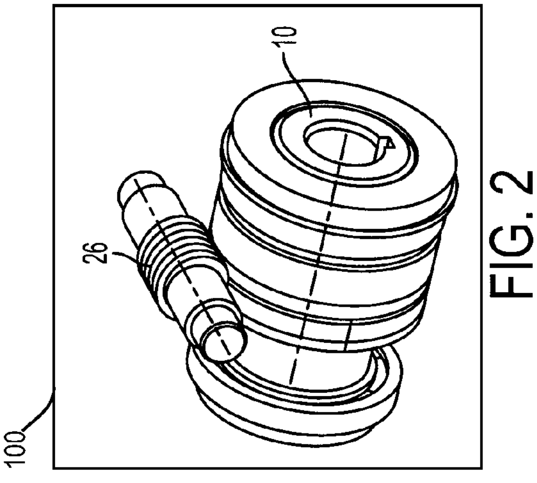
FIG. 2 shows a perspective representation of the assembled arrester device.

As shown in FIG. 2, the arrester device may be coupled to element 100. As discussed above in the "Background and Summary," element 100 may be a drive of a door whose leaf weight is not compensated by springs to ensure the safe operation of the door. The arrester device may be integrated in the drive. Further, also as discussed above, element 100 may be a door shaft of a door, the arrester device attached directly to the door shaft.

The invention claimed is:

1. An arrester device for closing apparatus comprising a worm gear rotationally fixedly connected to an output shaft serving as a winding shaft and a self-locking worm which is in communication with an input shaft, wherein an auxiliary worm gear is seated on an eccentric region of the output shaft with clearance, the eccentric region of the output shaft having an amount of eccentricity, the auxiliary worm gear having the same amount of eccentricity as the eccentric region of the output shaft and the arrester being assembled such that the output shaft and the auxiliary worm gear are concentric about an axis of the output shaft so that the eccentricities of the auxiliary worm gear and the output shaft are cancelled with respect to the axis of the output shaft, with the auxiliary worm gear in communication with the self-locking worm via a toothed region, the toothed region of the auxiliary worm gear and the clearance between the output shaft and the auxiliary worm gear collectively allowing the auxiliary worm gear to follow a movement of the worm gear without load, wherein the auxiliary worm gear is supported against a cylindrical region of a transmission housing on movement of the auxiliary worm out of the concentric position about the axis of the output shaft.

2. An arrester device in accordance with claim 1, wherein the auxiliary worm gear is deformable.

3. An arrester device in accordance with claim 1, wherein the auxiliary worm gear is deformable.

4. An arrester device in accordance with claim 1, wherein the arrester device is attached directly to a door shaft.

5. An arrester device in accordance with claim 1, wherein the arrester device is integrated in a drive of a door.

6. An arrester device for closing apparatus, comprising:

an output shaft having an eccentric region;

a first worm gear rotationally fixedly connected to the output shaft; and a second worm gear having an eccentric bore, wherein the second worm gear is coupled to the output shaft such that the eccentric region of the output shaft is seated within the eccentric bore of the second worm gear with clearance therebetween, wherein the auxiliary worm gear is supported against a cylindrical region of a transmission housing on movement of the auxiliary worm out of the concentric position about the axis of the output shaft.

7. The arrester device of claim 6, further comprising a worm coupled to the first worm gear and the second worm gear and the worm in communication with an input shaft.

8. The arrester device of claim 6, wherein the arrester device is attached directly to a door shaft.

9. The arrester device of claim 6, wherein the arrester device is integrated in a drive of a door.

10. An arrester device for a door comprising a worm gear rotationally fixedly connected to an output shaft serving as a winding shaft and a self-locking worm which is in communication with an input shaft, wherein an auxiliary worm gear is seated on an eccentric region of the output shaft with clearance, the eccentric region of the output shaft having an amount of eccentricity, the auxiliary worm gear having the same amount of eccentricity as the eccentric region of the output shaft and the arrester being assembled such that the output shaft and the auxiliary worm gear are concentric about an axis of the output shaft so that the eccentricities of the auxiliary worm gear and the output shaft are cancelled with respect to the axis of the output shaft, with the auxiliary worm gear in communication with the self-locking worm via a toothed region, the toothed region of the auxiliary worm gear and the clearance between the output shaft and the auxiliary worm gear collectively allowing the auxiliary worm gear to follow a movement of the worm gear without load, wherein the auxiliary worm gear is supported against a cylindrical region of a transmission housing on movement of the auxiliary worm out of the concentric position about the axis of the output shaft.

11. An arrester device in accordance with claim 10, wherein the arrester device is attached directly to a door shaft.

12. An arrester device in accordance with claim 10, wherein the arrester device is integrated in a drive of a door.

* * * * *